(12) United States Patent
Emery et al.

(10) Patent No.: US 11,748,336 B2
(45) Date of Patent: Sep. 5, 2023

(54) METHOD AND APPARATUS FOR MANAGING MEASUREMENT DEVICE BASED ON BLOCKCHAIN

(71) Applicants: Mettler-Toledo (Changzhou) Precision Instruments Ltd., Jiangsu (CN); Mettler-Toledo (Changzhou) Measurement Technology Ltd., Jiangsu (CN); Mettler-Toledo International Trading (Shanghai) Co., Ltd., (Shanghai) Pilot Free Trade Zone (CN)

(72) Inventors: Jean-Christophe Emery, Jiangsu (CN); Michael Heidingsfelder, Kiawah Island, SC (US); Eugen Schibli, Schaffhausen (CH); Feng Dai, Jiangsu (CN); Qing Chen, Jiangsu (CN); GuoJun Xie, Jiangsu (CN)

(73) Assignees: METTLER-TOLEDO (CHANGZHOU) PRECISION INSTRUMENTS LTD., Jiangsu (CN); METTLER-TOLEDO (CHANGZHOU) MEASUREMENT TECHNOLOGY LTD., Jiangsu (CN); METTLER-TOLEDO INTERNATIONAL TRADING (SHANGHAI) CO., LTD., Pilot Free Trade Zone (CN)

( * ) Notice: Subject to any disclaimer, the term of this patent is extended or adjusted under 35 U.S.C. 154(b) by 306 days.

(21) Appl. No.: 17/140,887

(22) Filed: Jan. 4, 2021

(65) Prior Publication Data
US 2021/0209094 A1 Jul. 8, 2021

(30) Foreign Application Priority Data
Jan. 2, 2020 (CN) .......................... 202010001674.9

(51) Int. Cl.
*G06F 16/23* (2019.01)
*G06F 11/07* (2006.01)

(52) U.S. Cl.
CPC ........ *G06F 16/2379* (2019.01); *G06F 11/079* (2013.01); *G06F 11/0736* (2013.01); *G06F 11/0751* (2013.01)

(58) Field of Classification Search
None
See application file for complete search history.

(56) References Cited

U.S. PATENT DOCUMENTS 10,930,089 B1 * 2/2021 Leise ..................... G07C 5/008
11,374,762 B2 * 6/2022 Nakamura ............ H04L 9/3247
(Continued)

FOREIGN PATENT DOCUMENTS

CN 109450638 A 3/2019

OTHER PUBLICATIONS

The extended European Search Report dated Aug. 16, 2021, by the European Patent Office in corresponding European Application No. 20213069.6 (10 pages).

*Primary Examiner* — Richard L Bowen
(74) *Attorney, Agent, or Firm* — BUCHANAN INGERSOLL & ROONEY PC

(57) ABSTRACT

A method and apparatus are disclosed for managing a measurement device based on a blockchain, which is applied to node devices in a blockchain network. The method can include obtaining device state data of the measurement device at various stages in the life cycle of the measurement device; constructing a target transaction based on the obtained device state data, and then sending the target transaction to other node devices in the blockchain network to perform consensus processing on the target transaction; and storing, when a consensus of the target transaction is
(Continued)

reached, the target transaction into a distributed ledger of the blockchain network, wherein the target transaction stored in the distributed ledger of the blockchain network is used for life cycle management of the measurement device.

18 Claims, 5 Drawing Sheets

(56) References Cited

U.S. PATENT DOCUMENTS

| | | | |
|---|---|---|---|
| 2019/0251295 A1* | 8/2019 | Vieyra | H04L 9/30 |
| 2020/0084026 A1* | 3/2020 | Reading | H04L 9/3239 |
| 2020/0103509 A1* | 4/2020 | MacMillan | G01S 17/58 |
| 2020/0136837 A1* | 4/2020 | Phatigaraphong | H04L 9/3268 |
| 2022/0147774 A1* | 5/2022 | Böderl-Ermel | G06F 16/24545 |
| 2022/0329411 A1* | 10/2022 | Kodeswaran | H04L 9/0643 |

* cited by examiner

US 11,748,336 B2

1

METHOD AND APPARATUS FOR MANAGING MEASUREMENT DEVICE BASED ON BLOCKCHAIN

RELATED APPLICATION

This application claims priority under 35 U.S.C. § 119 to Chinese Patent Application No. 202010001674.9 filed in China on Jan. 2, 2020, the entire content of which is hereby incorporated by reference in its entirety.

FIELD

One or more embodiments of the specification relate to the technical field of blockchains, in particular to a method and apparatus for managing a measurement device based on a blockchain.

BACKGROUND INFORMATION

Measurement devices or apparatuses have a wide range of applications in various industries. During their life cycle of production, logistics, installation, usage and maintenance, various device state information may be generated, and the various device state information may be of vital significance for the proper and normal use of the measurement devices. Currently, security for the storage and management of such information is insufficient and thus at the risk of abnormal information modification, and the application of the information is not enough.

Current methods for storing and managing various state information about a measurement device generally include decentralized physical storage solution has some limitations and risks. For example, information management and database or cloud storage-based information management. Using a decentralized physical storage information management, information retrieval and multi-functional information uses cannot be performed efficiently, and the information may be lost due to failure of a storage device. Using a database or cloud storage-based information management, although efficiency of information retrieval and use application is improved, the security remains insufficient.

SUMMARY

A method is disclosed for managing a measurement device based on a blockchain, which is applied to node devices in a blockchain network, the method comprising: obtaining device state data of the measurement device at various stages in a life cycle of the measurement device; constructing a target transaction based on the obtained device state data, and then sending the target transaction to other node devices in the blockchain network to perform consensus processing on the target transaction; and storing, when a consensus of the target transaction is reached, the target transaction into a distributed ledger of the blockchain network, wherein the target transaction stored in the distributed ledger of the blockchain network is used for life cycle management of the measurement device.

An apparatus for managing a measurement device based on a blockchain, which is applied to node devices in a blockchain network, the apparatus comprising: an obtaining unit for obtaining device state data of the measurement device at various stages in the life cycle of the measurement device; a sending unit for constructing a target transaction based on the obtained device state data, and then sending the target transaction to other node devices in the blockchain network to perform consensus processing on the target transaction; and a storage unit for storing, when a consensus of the target transaction is reached, the target transaction into a distributed ledger of the blockchain network, wherein the target transaction stored in the distributed ledger of the blockchain network is used for life cycle management of the measurement device.

BRIEF DESCRIPTION OF THE DRAWINGS

Features and advantages of the present invention will become more apparent from a reading of the detailed description of exemplary embodiments in combination with the drawings, wherein like elements are represented by like reference numerals unless otherwise indicated, and wherein.

DETAILED DESCRIPTION

Figure 1:
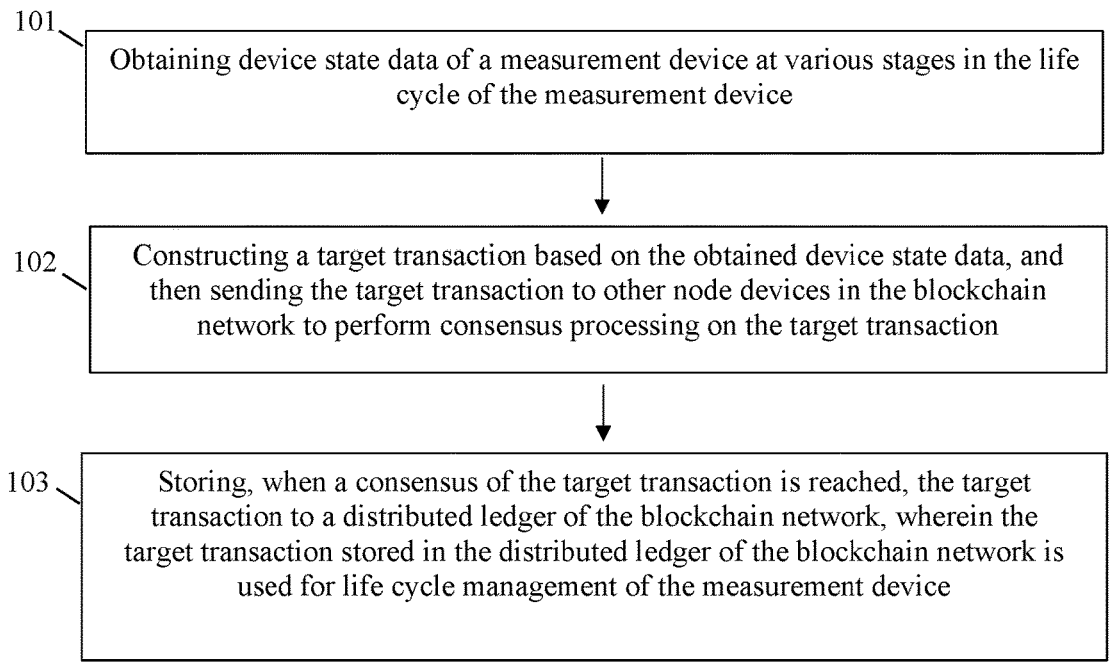
FIG. 1 is a schematic flow diagram of a method for managing a measurement device based on a blockchain according to an exemplary embodiment.

Exemplary embodiments as disclosed provide a method and apparatus for managing a measurement device based on a blockchain, a computer device and a computer readable storage medium.

The exemplary embodiments as disclosed provide a method for managing a measurement device based on a blockchain, which is applied to node devices in a blockchain network, the method including: obtaining device state data of the measurement device at various stages in the life cycle of the measurement device; constructing a target transaction based on the obtained device state data, and then sending the target transaction to other node devices in the blockchain network to perform consensus processing on the target transaction; and storing, when a consensus of the target transaction is reached, the target transaction into a distributed ledger of the blockchain network, wherein the target transaction stored in the distributed ledger of the blockchain network is used for life cycle management of the measurement device.

In another illustrated exemplary embodiment, the target transaction includes the device state data or a ciphertext of the device state data; and the life cycle includes a plurality of stages within a cycle of the measurement device from production to retirement, wherein the life cycle includes any combination of the following stages: a production stage, a logistics stage, an installation stage, a usage stage, and a maintenance stage.

In another illustrated exemplary embodiment, a smart contract for life cycle management of the measurement device is deployed in the blockchain; and the life cycle management of the measurement device includes: invoking, in response to a target invocation transaction for life cycle management of the measurement device sent by a management client, a life cycle management logic declared by the smart contract for life cycle management of the measurement device based on the device state data.

In another illustrated exemplary embodiment, device state data corresponding to the installation stage includes device calibration information data; and the life cycle management logic includes a calibration logic for the measurement device, wherein the calibration logic for the measurement device includes:

step A, calibrating the measurement device;

step B, obtaining the target transaction from the distributed ledger of the blockchain, wherein the target transaction includes the latest calibration information data corresponding to the measurement device;

step C, obtaining existing calibration information data of the measurement device; and step D, determining whether the latest calibration information data and the existing calibration information data are identical, and if the latest calibration information data is different from the existing calibration information data, performing the steps A to D again until the latest calibration information data is identical to the existing calibration information data.

In another illustrated exemplary embodiment, device state data corresponding to the usage stage includes a lead-sealing identification code; the life cycle management logic includes an electronic lead-sealing state management logic for the measurement device; wherein the electronic lead-sealing state management logic includes:

step A, obtaining the target transaction from the distributed ledger of the blockchain, wherein the target transaction includes the latest lead-sealing identification code corresponding to the measurement device;

step B, obtaining an existing lead-sealing identification code of the measurement device; and step C, determining whether the latest lead-sealing identification code and the existing lead-sealing identification code are identical, and if the latest lead-sealing identification code is different from the existing lead-sealing identification code, step D, performing a preset prompt or alarm operation.

In another illustrated exemplary embodiment, device state data corresponding to the usage stage includes abnormal state information data; and the life cycle management logic includes an abnormal state management logic for the the abnormal state management logic includes:

step A, obtaining the target transaction from the distributed ledger of the blockchain, wherein the target transaction includes abnormal state information corresponding to the measurement device; and step B: executing a preset failure analysis logic based on the abnormal state information.

In another illustrated exemplary embodiment, device state data corresponding to the usage stage includes device performance indicator data; and the life cycle management logic includes a device performance state management logic for the measurement device, wherein the device performance state management logic includes:

step A, obtaining the target transaction from the distributed ledger of the blockchain, wherein the target transaction includes device performance indicator data of an initial state corresponding to the measurement device;

step B, obtaining device performance indicator data of an existing state of the measurement device; and step C, determining whether the device performance indicator data of the initial state and the device performance indicator data of the existing state are identical, and if the device performance indicator data of the initial state is different from the device performance indicator data of the existing state, step D, performing a preset performance difference processing logic.

In another illustrated exemplary embodiment, performance indicator data includes one or more of metering performance indicator data, measurement precision indicator data, creep indicator data, measurement repeatability indicator data, operating environment indicator data, and electromagnetic compatibility indicator data.

In another illustrated exemplary embodiment, device state data corresponding to the usage stage includes device operating environment data, wherein the device operating environment data includes one or more of temperature, humidity, air pressure, shock, load, and device tilt data.

In another illustrated exemplary embodiment, device state data corresponding to the maintenance stage includes one or more of maintenance service personnel data, maintenance time data, and maintenance device identifier data.

In another illustrated exemplary embodiment, a node device for life cycle management of the measurement device includes a metering supervision institution node device.

In another illustrated exemplary embodiment, the target transaction includes a classification index value that is used to identify the category of the device state data.

In another illustrated exemplary embodiment, the node device includes the measurement device.

In another illustrated exemplary embodiment, the blockchain is an alliance chain, and a process of joining the measurement device to the blockchain network includes:

obtaining, by an alliance member node device of the alliance chain, a chain entry request from the measurement device; and determining whether the measurement device conforms to a preset chain entry condition for nodes; and if yes, sending, to the measurement device, a verification of chain entry permission to be a node device of the alliance chain so as to enable the measurement device to join the blockchain network after the verification of chain entry permission is passed.

In another illustrated exemplary embodiment, the distributed ledger of the blockchain includes a local storage database of the node devices of the blockchain network, or a database of cloud storage servers connected to the node devices of the blockchain network.

The present specification further describes an exemplary apparatus for managing a measurement device based on a blockchain, which is applied to node devices in a blockchain network, the apparatus including:

an obtaining unit for obtaining device state data of the measurement device at various stages in the life cycle of the measurement device;

a sending unit for constructing a target transaction based on the obtained device state data, and then sending the target transaction to other node devices in the blockchain network to perform consensus processing on the target transaction; and a storage unit for storing, when a consensus of the target transaction is reached, the target transaction into a distributed ledger of the blockchain network, wherein the target transaction stored in the distributed ledger of the blockchain network is used for life cycle management of the measurement device.

In another illustrated exemplary embodiment, the target transaction includes the device state data or a ciphertext of the device state data; and the life cycle includes a plurality of stages within a cycle of the measurement device from production to retirement, wherein the life cycle includes any combination of the following stages: a production stage, a logistics stage, an installation stage, a usage stage, and a maintenance stage.

In another illustrated exemplary embodiment, a smart contract for life cycle management of the measurement device is deployed in the blockchain; and the life cycle management of the measurement device includes: invoking, in response to a target invocation transaction for life cycle management of the measurement device sent by a management client, a life cycle management logic declared by the smart contract for life cycle management of the measurement device based on the device state data.

In another illustrated exemplary embodiment, device state data corresponding to the installation stage includes device calibration information data; and the life cycle management logic includes a calibration logic for the measurement device, wherein the calibration logic for the measurement device includes:

step A, calibrating the measurement device;

step B, obtaining the target transaction from the distributed ledger of the blockchain, wherein the target transaction includes the latest calibration information data corresponding to the measurement device;

step C, obtaining existing calibration information data of the measurement device; and step D, determining whether the latest calibration information data and the existing calibration information data are identical, and if the latest calibration information data is different from the existing calibration information data, performing the steps A to D again until the latest calibration information data is identical to the existing calibration information data.

In another illustrated exemplary embodiment, device state data corresponding to the usage stage includes a lead-sealing identification code; the life cycle management logic includes an electronic lead-sealing state management logic for the measurement device; wherein the electronic lead-sealing state management logic includes:

step A, obtaining the target transaction from the distributed ledger of the blockchain, wherein the target transaction includes the latest lead-sealing identification code corresponding to the measurement device;

step B, obtaining an existing lead-sealing identification code of the measurement device; and step C, determining whether the latest lead-sealing identification code and the existing lead-sealing identification code are identical, and if the latest lead-sealing identification code is different from the existing lead-sealing identification code, step D, performing a preset prompt or alarm operation.

In another illustrated exemplary embodiment, device state data corresponding to the usage stage includes abnormal state information data; and the life cycle management logic includes an abnormal state management logic for the measurement device, wherein the abnormal state management logic includes:

step A, obtaining the target transaction from the distributed ledger of the blockchain, wherein the target transaction includes abnormal state information corresponding to the measurement device; and step B: executing a preset failure analysis logic based on the abnormal state information.

In another illustrated exemplary embodiment, device state data corresponding to the usage stage includes device performance indicator data; and the life cycle management logic includes a device performance state management logic for the measurement device, wherein the device performance state management logic includes:

step A, obtaining the target transaction from the distributed ledger of the blockchain, wherein the target transaction includes device performance indicator data of an initial state corresponding to the measurement device;

step B, obtaining device performance indicator data of an existing state of the measurement device; and step C, determining whether the device performance indicator data of the initial state and the device performance indicator data of the existing state are identical, and if the device performance indicator data of the initial state is different from the device performance indicator data of the existing state, step D, performing a preset performance difference processing logic.

In another illustrated exemplary embodiment, performance indicator data includes one or more of metering performance indicator data, measurement precision indicator data, creep indicator data, measurement repeatability indicator data, operating environment indicator data, and electromagnetic compatibility indicator data.

In another illustrated exemplary embodiment, device state data corresponding to the usage stage includes device operating environment data, wherein the device operating environment data includes one or more of temperature, humidity, air pressure, shock, load, and device tilt data.

In another illustrated exemplary embodiment, device state data corresponding to the maintenance stage includes one or more of maintenance service personnel data, maintenance time data, and maintenance device identifier data.

In another illustrated exemplary embodiment, a node device for life cycle management of the measurement device includes a metering supervision institution node device.

In another illustrated exemplary embodiment, the target transaction includes a classification index value that is used to identify the category of the device state data.

In another illustrated exemplary embodiment, the node device includes the measurement device.

In another illustrated exemplary embodiment, the blockchain is an alliance chain, and a process of joining the measurement device to the blockchain network includes:

obtaining, by an alliance member node device of the alliance chain, a chain entry request from the measurement device; and determining whether the measurement device conforms to a preset chain entry condition for nodes; and if yes, sending, to the measurement device, a verification of chain entry permission to be a node device of the alliance chain so as to enable the measurement device to join the blockchain network after the verification of chain entry permission is passed.

In another illustrated exemplary embodiment, the distributed ledger of the blockchain includes a local storage database of the node devices of the blockchain network, or a database of cloud storage servers connected to the node devices of the blockchain network.

A computer device is disclosed, which includes: a memory and a processor, wherein the memory has stored thereon a computer program executable by the processor that, when executed by the processor, causes the implementation of the method for managing a measurement device based on a blockchain as described in the above embodiments.

A computer readable storage medium is disclosed having stored thereon a computer program that, when executed by a processor, causes the implementation of the method for managing a measurement device based on a blockchain as described in the exemplary embodiments.

It can be seen from the above technical solutions that with a method and apparatus for managing a measurement device based on a blockchain provided in this specification and a distributed ledger storage mechanism based on blockchain technology, the target transaction is stored or deposited in a decentralized manner (when the device state data is encrypted) into all node devices, and co-maintained by participating node devices of the blockchain, and all records are traceable. Moreover, based on a consensus mechanism of the blockchain, the target transaction provided by each node device cannot be tampered after being provided, thereby ensuring the authenticity and security of the device state data as a basis for the target transaction. Furthermore, by reading an authentic and valid target transaction from the blockchain and performing life cycle management on the measurement device based on the device state data, errors or losses in the management that may be caused by the tampering of the device state data may be avoided.

Exemplary embodiments and implementations are described in detail herein, examples of which are shown in appended drawings wherein identical numbers in different drawings represent identical or similar elements unless otherwise indicated. Implementations described in the following exemplary embodiments are not intended to represent all implementations consistent with one or more embodiments disclosed herein. Rather, they are merely examples of apparatuses and methods consistent with some aspects of one or more embodiments disclosed herein.

It should be noted that steps, elements, or features of a described method may not be required to be performed in the order shown and/or described herein. In some embodiments, steps, elements, or features of the method may be more or fewer than those shown and/or described herein, a single step, element, or feature described herein may also be decomposed or split into a plurality of steps, while a plurality of described steps may be combined into a single step as well.

Measurement devices have a wide range of applications in various industries. The life cycle of the measurement device may include a production stage, a logistics stage, an installation stage, a usage stage, a maintenance stage or any combination of the above stages of the measurement device. During the life cycle of the measurement device, various device state information data can be produced, generated, or created, such as device production environment data produced in the production stage (including, for example, temperature and humidity, acid and alkali conditions, production parameters and difference adjustment parameters of devices such as machine tools, etc.), logistics circulation data produced in the logistics stage (including, for example, information about the time of exiting from and entering a logistics station, environmental information transfer, abnormal logistics transit information, etc.), installation adjustment data produced in the installation stage (including, for example, electronic lead-sealing states, device calibration information, initial parameters, etc.), normal or abnormal usage data produced during the usage stage (including, for example, measurement data produced in normal use, error information when an abnormality occurs, software information carried by the associated device, etc.), and information data produced in the maintenance stage (including, for example, maintenance records, precision information about the associated device after maintenance, software update version numbers, etc.).

The device state data produced during the life cycle of a measurement device can be of vital significance for any designated normal use of the measurement device. Current methods for storing and managing various state information about a measurement device generally include (1) decentralized physical storage information management, that is, storing the device state data into computing servers of a manufacturer, a logistics provider, and/or a user client respectively, or (2) cloud storage data management performed by the above one or more parties. Security for the storage and management of such device state data above is considered insufficient and thus at risk of abnormal data modification. With a method of decentralized physical storage information management, information retrieval and using or applying the information cannot be performed efficiently, and the information may be lost due to failure of a storage device.

Furthermore, decentralized physical storage can impact the coordination, management, and use of the device state data generated during the life cycle of the measurement device.

In view of this, an exemplary method for managing a measurement device based on a blockchain is disclosed, which can be applied to node devices in a blockchain network.

A blockchain network system according to one or more exemplary embodiments of the specification can, for example, refer to a P2P network system comprising various node devices through a consensus mechanism and having a distributed data storage structure, where data in a blockchain is distributed within various "blocks" consecutively connected in time, a later or newer block contains a data summary of a preceding or previous block, and full data backup of all or some of nodes is achieved according to different specific consensus mechanisms (such as POW, POS, DPOS or PBFT). Those skilled in the art will appreciate that since a blockchain system is running under a corresponding consensus mechanism, data recorded into a blockchain database can be difficult to be tampered by any node, for example, for a blockchain employing POW consensus, it would take a hash rate of at least 51% of the whole network to attack or tamper with the existing data, therefore, the blockchain system is characterized by ensuring the security of data and protecting against attacks and tampering, which is not provided by centralized database systems. It can be seen therefrom that in exemplary embodiments provided in this specification, data recorded into a distributed ledger of a blockchain cannot be tampered with, thereby ensuring the authenticity and fairness of performing data management and use of data stored in the blockchain.

FIG. 1 illustrates process steps of an exemplary method for managing a measurement device based on a blockchain according to an exemplary embodiment of the specification, including:

step 101, obtaining device state data of the measurement device at various stages in the life cycle of the measurement device.

The specific type of the measurement device is not defined herein by way of limitation, and devices, apparatuses or device or apparatus modules that may have the function of measurement or calibration may all be encompassed within the scope of the measurement devices described herein.

The life cycle of the measurement device includes a plurality of stages within a cycle of the measurement device from production to retirement, such as a production stage, a logistics stage, an installation stage, a usage stage, a maintenance stage or any combination of the above multiple stages.

Device state data corresponding to the production stage of the measurement device may include various production parameters recorded during production of the measurement device, such as production date, raw materials for production, production processes, product serial numbers, production environment, production device parameters, and information data of various production chains of the measurement device.

Device state data corresponding to the logistics stage of the measurement device may include information data produced by the measurement device in the circulation process after production, such as information about the time of exiting from and entering a logistics station, environmental information on the way, abnormal logistics transit information, and the like; and for a rather precise and precious measurement device, the device state data in the logistics stage is of vital depository significance in traceability management of the measurement device.

The measurement device, especially a large-scale or precise measurement device, should be installed and debugged before coming into use. Therefore, device state data corresponding to the installation stage of the measurement device may include calibration parameters desired and/or required for use by the measurement device in the installation stage or data produced in the installation stage such as error probability parameters, installation state description, parameter backup or recovery information (for example, factory setting parameters), and the like.

Device state data corresponding to the usage stage of the measurement device may include any information data produced or required for reference and use by the measurement device during use, such as measurement data records produced in normal use, error information when an abnormality occurs (abnormal temperature, overloaded shock, etc.), software information carried by the device, standard operation procedure (SOP) information data, and the like.

Electronic lead-sealing information data of the measurement device is information data reflecting whether the measurement device is suffered from behaviors such as unknown sealing off or abnormal damage. Therefore, the device state data corresponding to the usage stage may also include the electronic lead-sealing information data of the measurement device (or a particular element or module of the measurement device).

The performance indicator data of the measurement device also belongs to the device state data corresponding to the usage stage, and based on the specific type and attribute of the measurement device, the device performance indicator data may include one or more of metering performance indicator data, measurement precision indicator data, creep indicator data, measurement repeatability indicator data, operating environment indicator data, and electromagnetic compatibility indicator data.

When the measurement device is used and operates, its operating states and measurement results may be affected by the operating environment. Therefore, the device state data corresponding to the usage stage may also include device operating environment data, such as one or more of temperature, humidity, air pressure, burden or load, shock, tilt, and other data when the device operates.

Device state data corresponding to the maintenance stage of the measurement device may include any information data produced or referenced and used by the measurement device during maintenance, such as recovery data (factory setting data), fault detection procedure data, maintenance records, maintenance service personnel data, maintenance time, maintenance device identifier, and the like.

The node devices may be a computer device managing a production, logistics, installation, use or maintenance process of the measurement device, or may be a computer device communicatively connected to the measurement device, or may be the measurement device itself, which is not defined by way of limitation herein. Therefore, the specific approach for obtaining the device state data described above may refer to obtaining, by the node device, based on information recording of the production, logistics, installation, use or maintenance process of the measurement device, or based on the communication with the measurement device, or the device state data may be generated by the node device itself (when the node device is the measurement device), which is not defined by way of limitation herein.

By using the measurement device as the node device to directly obtain the device state data, for example, the device state data produced, by the measurement device, in the installation, usage or maintenance stage, a data transmission procedure is simplified, the data processing efficiency is improved, and further, data error or malicious modification may be avoided to some extent, when compared with obtaining the device state data by transmitting data to a management computing device by the measurement device, or by directly recording the data by the management computing device.

Figure 2:
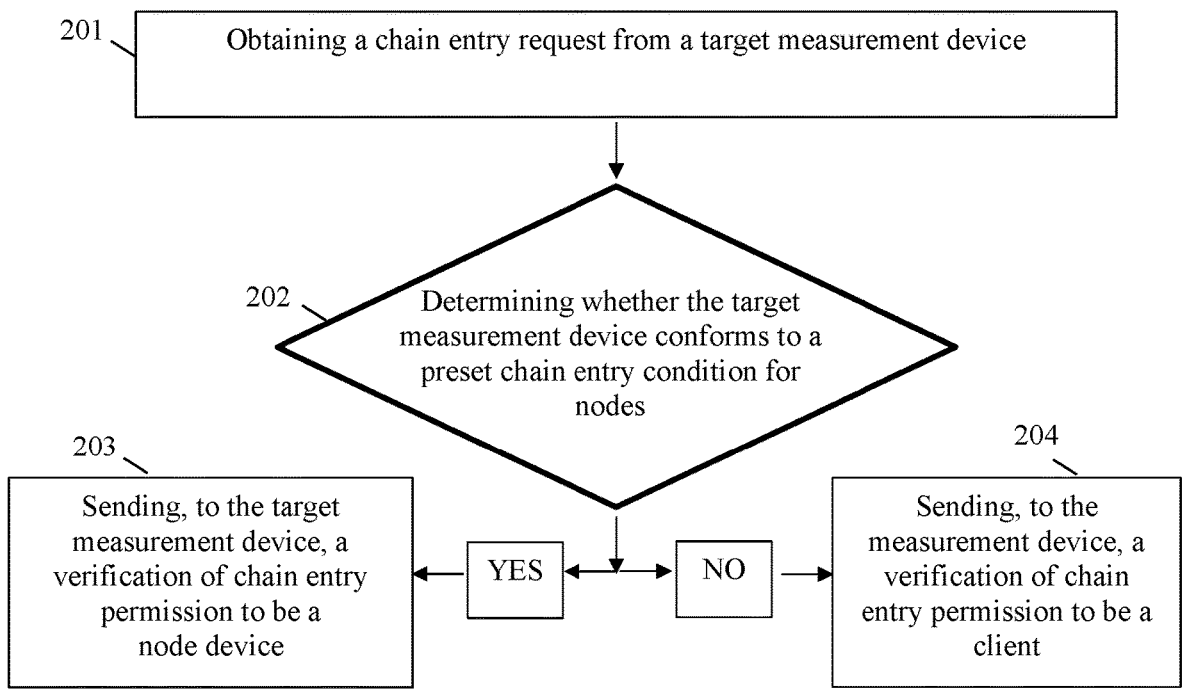
FIG. 2 is a schematic flow diagram of an chain entry request from the measurement device according to an exemplary embodiment.

In exemplary embodiments shown in FIG. 2, in a blockchain network system using an alliance chain as a architecture, the process of the measurement device joining a blockchain network to become a node device of the blockchain network may include:

step 201, obtaining, by an alliance member node device of the alliance chain, a chain entry request from the measurement device;

step 202, determining, by the alliance member node device of the alliance chain, whether the measurement device conforms to a preset chain entry condition for nodes, wherein the chain entry condition for nodes is a physical condition that should be met when the computing device may serve as the node device of the blockchain network system, for example, the preset chain entry condition for nodes may include preset storage capacity thresholds, preset processor operation frequency thresholds, or the like; and if yes, step 203, sending, by the alliance member node device of the alliance chain, to the measurement device, a verification of chain entry permission to be a node device of the alliance chain, wherein the verification of chain entry permission is a verification of permission which needs to be passed by the measurement device to join the blockchain network system as a node device, and after the verification is passed, the measurement device may join the blockchain network as a node device, that is, may send a data synchronization request to adjacent node devices, so as to obtain existing data in the distributed ledger of the blockchain, and if not, step 204, sending, to the measurement device, a verification of chain entry permission to be an alliance member client, wherein the verification of chain entry permission to be an alliance member client is a verification of permission which needs to be passed by the measurement device to join the blockchain network system as a client of an alliance member node, and after the verification is passed, the measurement device may send state data to the distributed ledger of the blockchain by communicating with the alliance member node device or obtain data stored in the distributed ledger of the blockchain by communicating with the alliance member node device.

With the management of chain entry permission of the measurement device illustrated in FIG. 2, the measurement device may access the blockchain network system directly or indirectly, and store the state data of the measurement device to the distributed ledger of the blockchain directly or indirectly. Therefore, not only the efficiency of data storage backup is improved, but also the timeliness, effectiveness, and reliability of storage of the state data are improved based on a tamper-resistant mechanism of the blockchain.

Step 102, constructing a target transaction based on the obtained device state data, and then sending the target transaction to other node devices in the blockchain network to perform consensus processing on the target transaction.

For authentic data produced in the physical world, it may be constructed into a standard transaction format supported by the blockchain, and then published to the blockchain, consensus processing is performed on the received transaction by the node devices of the blockchain, and after a consensus is reached, the transaction is packed into a block by a node device, which serves as an accounting node, in the blockchain, and stored in the blockchain persistently (this process may be referred to as "depository").

The target transaction constructed based on the device state data may include the original text of the device state data. Since data stored in the distributed ledger of the blockchain is backed up within a plurality of node devices of the blockchain, in order to ensure the data privacy security, the target transaction may also include encrypted device state data, depository data of the device state data (for example, a hash summary value of the device state data), or the like.

Specific consensus algorithm on which the consensus processing is based is not defined in this exemplary embodiment. Currently, consensus algorithms supported in the blockchain can include:

a first type of consensus algorithm, that is, a consensus algorithm where a node device needs to compete for accounting authority for each round of accounting cycles, for example, a consensus algorithm such as Proof of Work (POW), Proof of Stake (POS), Delegated Proof of Stake (DPOS), and the like; and a second type of consensus algorithm, that is, a consensus algorithm where for each round of accounting cycles, an accounting node is elected (without competing for the accounting authority), for example, a consensus algorithm such as Practical Byzantine Fault Tolerance (PBFT) and the like.

In a blockchain network employing the first type of consensus algorithm, the node devices competing for the accounting authority may all perform a transaction after receiving the transaction. There may be a node device, among the node devices competing for the accounting authority, winning out in the current competing for the accounting authority and becoming a accounting node. The accounting node may pack the received transaction together with other transactions to generate a latest block and send the latest block generated or a block header of the latest block to other node devices for consensus processing.

In a blockchain network employing the second type of consensus algorithm, a node device having the accounting authority has been agreed before this round of accounting. Therefore, after receiving a transaction, the node device may send the transaction to an accounting node if it is not an accounting node of this round. For the accounting node of this round, the transaction may be performed during or before a process that the transaction and other transactions are packed to generate the latest block. After the latest block is generated, the accounting node may send the latest block or a block header of the latest block to other node devices for consensus processing.

Figure 3:
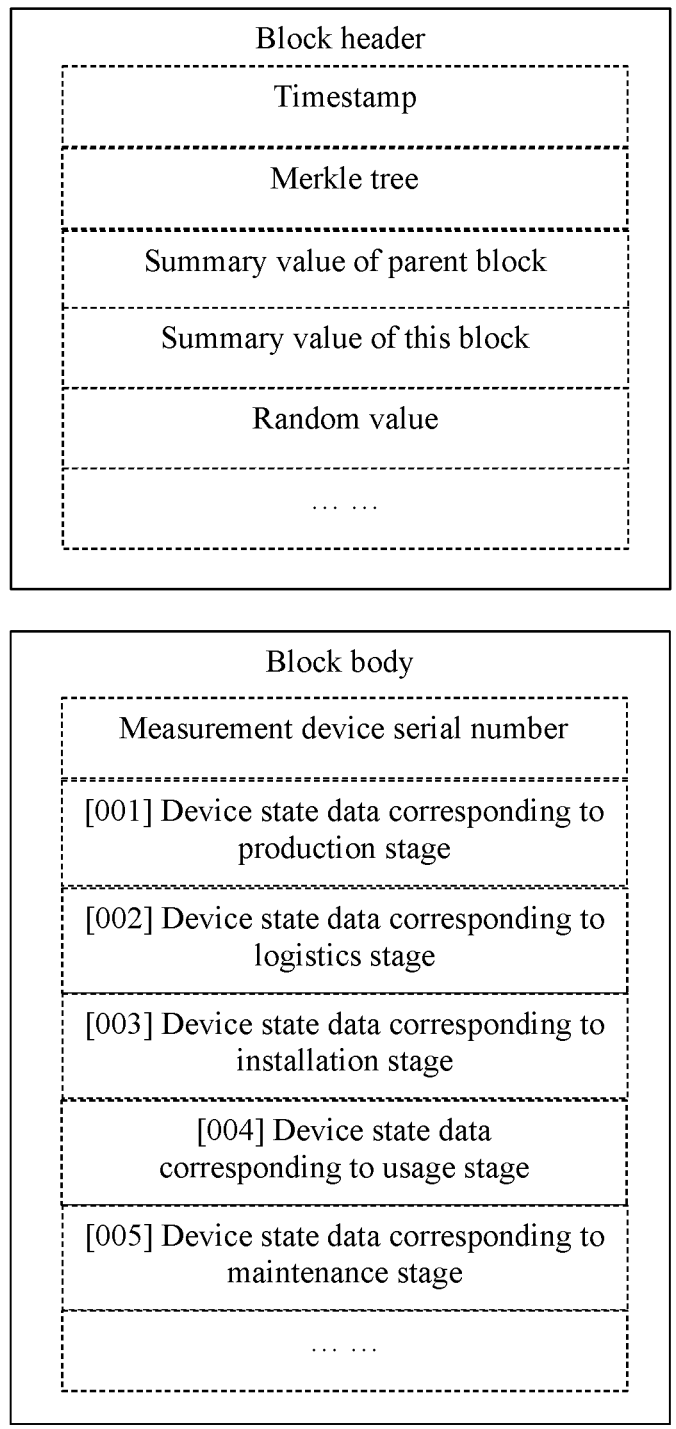
FIG. 3 is a schematic diagram of contents of a block according to an exemplary embodiment.

FIG. 3 illustrates contents of an exemplary block packed with one or more target transactions. As shown in FIG. 3, device state data contained in a block body of the block may include: state data of the measurement device, such as product serial number, production parameter information, logistics transit information, measurement and calibration information, electronic lead-sealing information, abnormal state information, measurement software version information, and other information. It should be noted that various information data described herein may be included in one or more target transactions.

In order to facilitate the statistics, retrieval, and application of device state data, as shown in FIG. 3, the target transaction may include a classification index value that is used to identify the category of the device state data. For example, the following classification index values are set for device state data corresponding to the production stage, the logistics stage, the installation stage, the usage stage, and the maintenance stage: [001], [002], [003], [004], [005], and the like.

Step 103, storing, when a consensus of the target transaction is reached, the target transaction into a distributed ledger of the blockchain network, wherein the target transaction stored in the distributed ledger of the blockchain network is used for life cycle management of the measurement device.

As described herein, no matter which consensus algorithm shown above is used in the blockchain, the accounting node of this round may pack the received transactions to generate the latest block and send the latest block generated or a block header of the latest block to other node devices for consensus verification. If other node devices receive the latest block or the block header of the latest block and there is no problem after verification, the latest block may be added to the end of the original blockchain to complete an accounting process of the blockchain. During a process that other nodes verify a new block or block header sent by the accounting node, transactions included in the block may also be performed.

It should be noted that the distributed ledger of the blockchain described herein includes a local storage database of the node devices of the blockchain network system, or a database of cloud storage servers communicatively connected to the node devices of the blockchain network system.

With the method for managing a measurement device based on a blockchain provided in one or more of the embodiments described herein and a distributed ledger storage mechanism based on blockchain technology, the target transactions are stored into all node devices in a decentralized manner and co-maintained by participating node devices of the blockchain, and all records are traceable. Moreover, based on a consensus mechanism of the blockchain, the target transaction provided by each node device cannot be tampered after being provided, thereby ensuring the authenticity and security of the device state data as a basis for the target transaction. Since the device state data may include information data corresponding to the life cycle stages of the measurement device such as the production stage, the logistics stage, the installation stage, the usage stage, and the maintenance stage, with a method for storing data based on the blockchain provided in one or more of the embodiments described above, the security and privacy (when the target transaction includes encrypted device state data) of the life cycle management of the measurement device is improved, and the efficiency of data management can be improved as well.

Contents of the device state data stored in the distributed ledger of the blockchain may increase continuously with the circulation and use of the measurement device. Based on the state data of the measurement device, analysis and application may be performed on various device state information about the measurement device, for example, big data analysis or artificial intelligence technology may be used to perform information analysis on a full life cycle of the measurement device, or life cycle management contents of the measurement device such as traceability tracking, usage calibration, lead-sealing state determination, and usage state determination.

In an illustrated exemplary embodiment, any node device of the blockchain network system may obtain the target transaction from the distributed ledger of the blockchain, and perform life cycle management on the measurement device at the node device locally based on the device state data included in the target transaction or the encrypted device state data. A node device obtaining the target transactions and performing life cycle management of the measurement device may be referred to as a management client.

In another illustrated exemplary embodiment, a smart contract for life cycle management of the measurement device is deployed in the blockchain; and the blockchain network may be provided with a management client communicatively connected to the node device to perform life cycle management of the measurement device. The life cycle management of the measurement device includes: invoking, in response to a target invocation transaction for life cycle management of the measurement device sent by a management client, a life cycle management logic declared by the smart contract for life cycle management of the measurement device based on the device state data. Compared with running life cycle management locally by a centralized management client, invoking the smart contract at any time in response to the target invocation transaction sent by a corresponding client may improve the efficiency of life cycle management greatly; moreover, performing with the smart contract has the advantages of lower human intervention and decentralized authority, which further increases the fairness of life cycle management behaviors.

A plurality of embodiments of life cycle management of the measurement device are described herein based on the target transaction.

Exemplary Embodiment 1: Method for Managing Calibration of a Measurement Device

Calibration may refer to detecting, by using standard metering parameters, whether the accuracy (precision) of a measurement device conforms to a standard, which is mostly used for a measurement device of high precision; and calibration may also be considered to be alignment. In order to ensure the accuracy of measurement results generated by the measurement device during use, the measurement device generally needs to be calibrated before use (which may be understood as an installation stage). Calibration information described in this embodiment may include standard metering parameters used during calibration.

The measurement device may be calibrated initially before use, and calibration information produced or used in an initial calibration stage may be uploaded to the distributed ledger of the blockchain in a transaction format by the measurement device (as a node device) or a node device connected to the measurement device. It should be noted that the transaction may also include a classification index value corresponding to the calibration information. If failure occurs to the measurement device during use, the calibration information about the measurement device may need to be updated once again, and the updated calibration information also needs to be transmitted to the distributed ledger of the blockchain in a transaction format.

Figure 4:
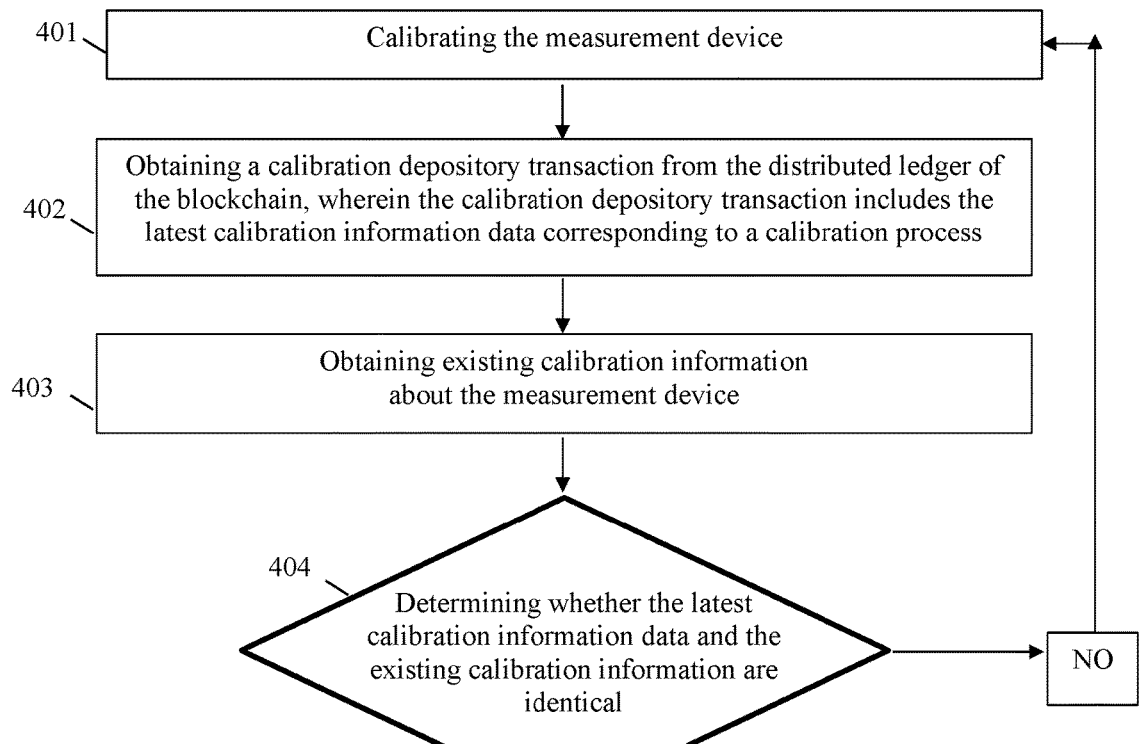
FIG. 4 is a schematic flow diagram of a method for managing calibration of a measurement device based on a blockchain according to another exemplary embodiment.

FIG. 4 illustrates exemplary calibration management of the measurement device based on an exemplary method for managing a measurement device as described herein. A management process includes:

step 401, calibrating the measurement device;

step 402, obtaining and calibrating a calibration depository transaction from the distributed ledger of the blockchain, wherein the calibration depository transaction includes the latest calibration information data corresponding to a calibration process;

step 403, obtaining existing calibration information about the measurement device; and step 404, determining whether the latest calibration information data and the existing calibration information are identical, if the latest calibration information and the existing calibration information are identical, a calibration state of the measurement device being normal, and if the latest calibration information is different from the existing calibration information, performing the steps 401 to 404 again until the latest calibration information is identical to the existing calibration information.

With the process of managing calibration of the measurement device described in the steps 401 to 404, the measurement device may be debugged to a calibration state corresponding to the latest calibration information, and the tamper-resistant mechanism based on the blockchain is used for depository of the latest calibration information, which may prevent the latest calibration information from being tampered maliciously, thereby ensuring that the measurement device is running and used in the calibration state corresponding to the latest calibration information.

Exemplary Embodiment 2: Method for Managing Calibration of a Measurement Device by Using Invocation of a Smart Contract In an exemplary embodiment, a smart contract used to manage calibration of a measurement device is declared in the blockchain network, and the smart contract may declare a calibration management logic for the measurement device described in the steps 401-404. The measurement device may be communicatively connected to the management client of the blockchain, or the measurement device may serve as the management client of the blockchain. The method for managing calibration of a measurement device described in the embodiment may include:

invoking, in response to an invocation transaction for calibration management of the measurement device sent by the management client, the calibration management logic for the measurement device declared by the smart contract to calibrate the measurement device based on the latest calibration information deposited on the blockchain, thereby enabling the measurement device to conform to the device calibration state corresponding to the latest calibration information.

Calibration management of the measurement device may be completed automatically if a smart contract invocation transaction is sent to the blockchain by the management client, which saves the time and economic cost spent in calibrating the measurement device on site by professional personnel. Moreover, with the tamper-resistant mechanism based on the blockchain, the latest calibration information is prevented from being tampered maliciously, thereby ensuring that the measurement device reaches the accurate calibration state corresponding to the latest calibration information.

Exemplary Embodiment 3: Method for Managing an Electronic Lead-Sealing State of a Measurement Device In order to ensure the security or precision of the measuring device and prevent the measurement device from being enabled or having parameters changed without authorization, an electronic lead-sealing module can for example be generally provided for protecting the measurement device. The electronic lead-sealing module (such as an RFID radio frequency chip) is configured with a unique lead-sealing identification code which may correspond to an identity identifier such as a product serial number of the measurement device on a one-to-one basis. In an exemplary embodiment, device state data may include the lead-sealing identification code.

The lead-sealing identification code of the measurement device may be obtained by a data acquisition device when the measurement device is used, and the lead-sealing identification code and the identity identifier such as the product serial number of the measurement device can be uploaded to the distributed ledger of the blockchain in a transaction format by the measurement device (as a node device) or a node device connected to the measurement device. It should be noted that the transaction may also include a classification index value corresponding to the lead-sealing identification code. If a failure occurs to the measurement device during use or the measurement device is maintained and updated regularly, the electronic lead-sealing module may be reconfigured or replaced, at which time, the updated lead-sealing identification code and identity identifier such as a product serial number of the measurement device are uploaded to the distributed ledger of the blockchain in a transaction format by the measurement device (as a node device) or a node device connected to the measurement device, thereby ensuring that the latest effective lead-sealing identification code corresponding to the measurement device is deposited in the distributed ledger of the blockchain.

Figure 5:
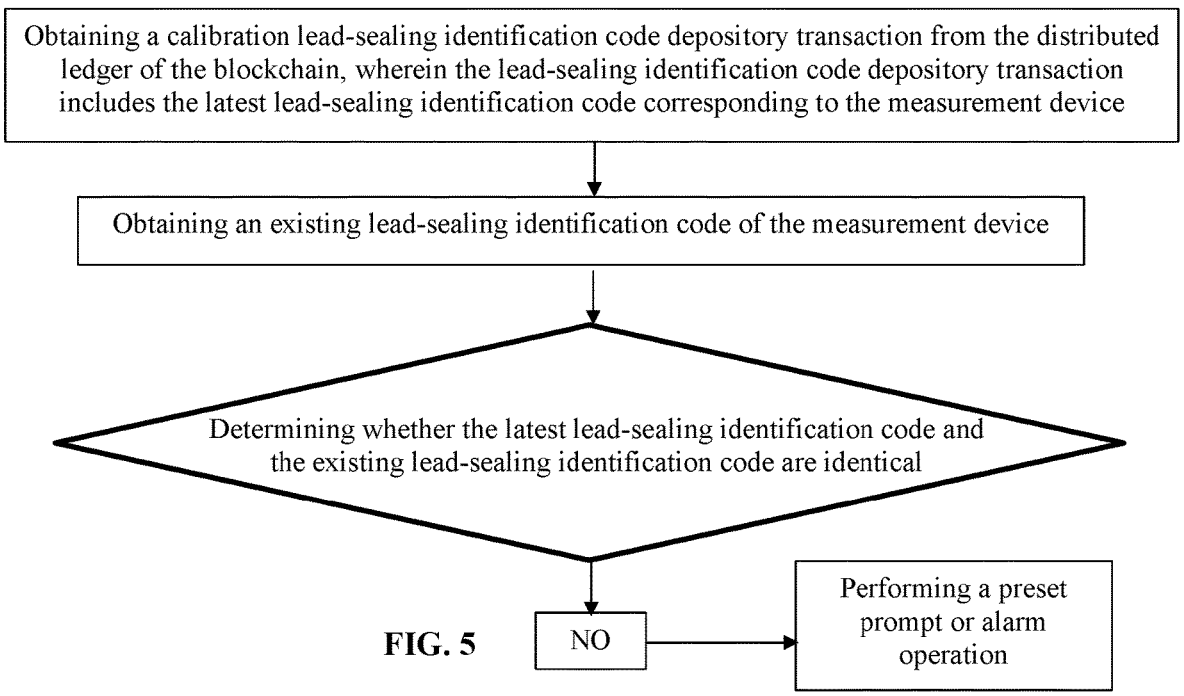
FIG. 5 is a schematic flow diagram of a method for managing an electronic lead-sealing state of a measurement device based on a blockchain according to another exemplary embodiment.

FIG. 5 illustrates electronic lead-sealing state management of the measurement device based on an exemplary method for managing a measurement device disclosed herein. A management process includes:

step 501, obtaining a calibration lead-sealing identification code depository transaction from the distributed ledger of the blockchain, wherein the lead-sealing identification code depository transaction includes the latest lead-sealing identification code corresponding to the measurement device;

step 502, obtaining an existing lead-sealing identification code of the measurement device; and step 503, determining whether the latest lead-sealing identification code and the existing lead-sealing identification code are identical, if the latest calibration information and the existing calibration information are identical, a lead-sealing state of the measurement device being normal, without abnormal enabling or parameter change, and if the latest lead-sealing identification code is different from the existing lead-sealing identification code, the lead-sealing state of the measurement device being abnormal, and unauthorized enabling or parameter change being likely to happen, at which time, a preset prompt or alarm operation may be performed as shown in step 504, for example, sending a prompt to a user interface of the management client, or sending an alarm signal to a management device for the measurement device remotely, so as to notice relevant personnel.

With the process of electronic lead-sealing state management of the measurement device described in the steps 501 to 504, the tamper-resistant mechanism based on the blockchain may deposit the latest effective lead-sealing identification code of the measurement device, so that when the existing lead-sealing identification code of the measurement device is different from the lead-sealing identification code deposited in the blockchain, it may be known accurately that unauthorized enabling or change have occurred to the measurement device, thereby facilitating the relevant personnel to know an abnormal state of the measurement device timely for responding accordingly.

Exemplary Embodiment 4: Method for Managing an Electronic Lead-Sealing State of a Measurement Device with Invocation of a Smart Contract In an exemplary embodiment, a smart contract used to manage the electronic lead-sealing state of the measurement device is declared in the blockchain network, and the smart contract may declare an electronic lead-sealing state management logic for the measurement device described in the steps 501 to 504. The measurement device may be communicatively connected to the management client of the blockchain, or the measurement device may serve as the management client of the blockchain. The method for managing an electronic lead-sealing state of a measurement device described in the embodiment may include:

invoking, in response to an invocation transaction for electronic lead-sealing state management of the measurement device sent by the management client, the electronic lead-sealing state management logic for the measurement device declared by the smart contract to compare an existing lead-sealing identification code of the measurement device with the latest lead-sealing identification code deposited on the blockchain, so that it can be known accurately whether an unauthorized abnormal change occurs to the measurement device.

Electronic lead-sealing state management of the measurement device may be completed automatically if the smart contract invocation transaction is sent to the blockchain by the management client, which saves the time and economic cost spent in querying the electronic lead-sealing state of the measurement device on site by professional personnel; with the tamper-resistant mechanism based on the blockchain, the latest lead-sealing identification code described above is prevented from being tampered maliciously, thereby ensuring the accuracy of the latest lead-sealing identification code; and based on a preset alarm or prompt operation logic, an alarm operation or record is completed automatically.

Exemplary Embodiment 5: Method for Managing a Device Performance State of a Measurement Device During use of exemplary measurement devices, many performance indicators can be used to characterize performance states of the measurement device, such as metering performance indicator, measurement precision indicator, creep indicator, measurement repeatability indicator, operating environment indicator, electromagnetic compatibility indicator, and the like. After the measurement device is used for a period of time, the performance of the device may change, and accordingly, the indicators may have some changes.

Device performance indicator data of an initial state of the measurement device may be obtained by a data acquisition device or a standard mold before the measurement device is used, and the device performance indicator data of the initial state and the identity identifier such as the product serial number of the measurement device are uploaded to the distributed ledger of the blockchain in a transaction format by the measurement device (as a node device) or a node device connected to the measurement device. It should be noted that the transaction may also include a classification index value corresponding to the device performance indicator data. After the measurement device is used for a certain time period or for a particular number of times, the device performance indicators may change, at which time, existing device performance indicator data of the measurement device is then obtained by the data acquisition device, the standard mold or the measurement device itself through measurement and calculation.

Figure 6:
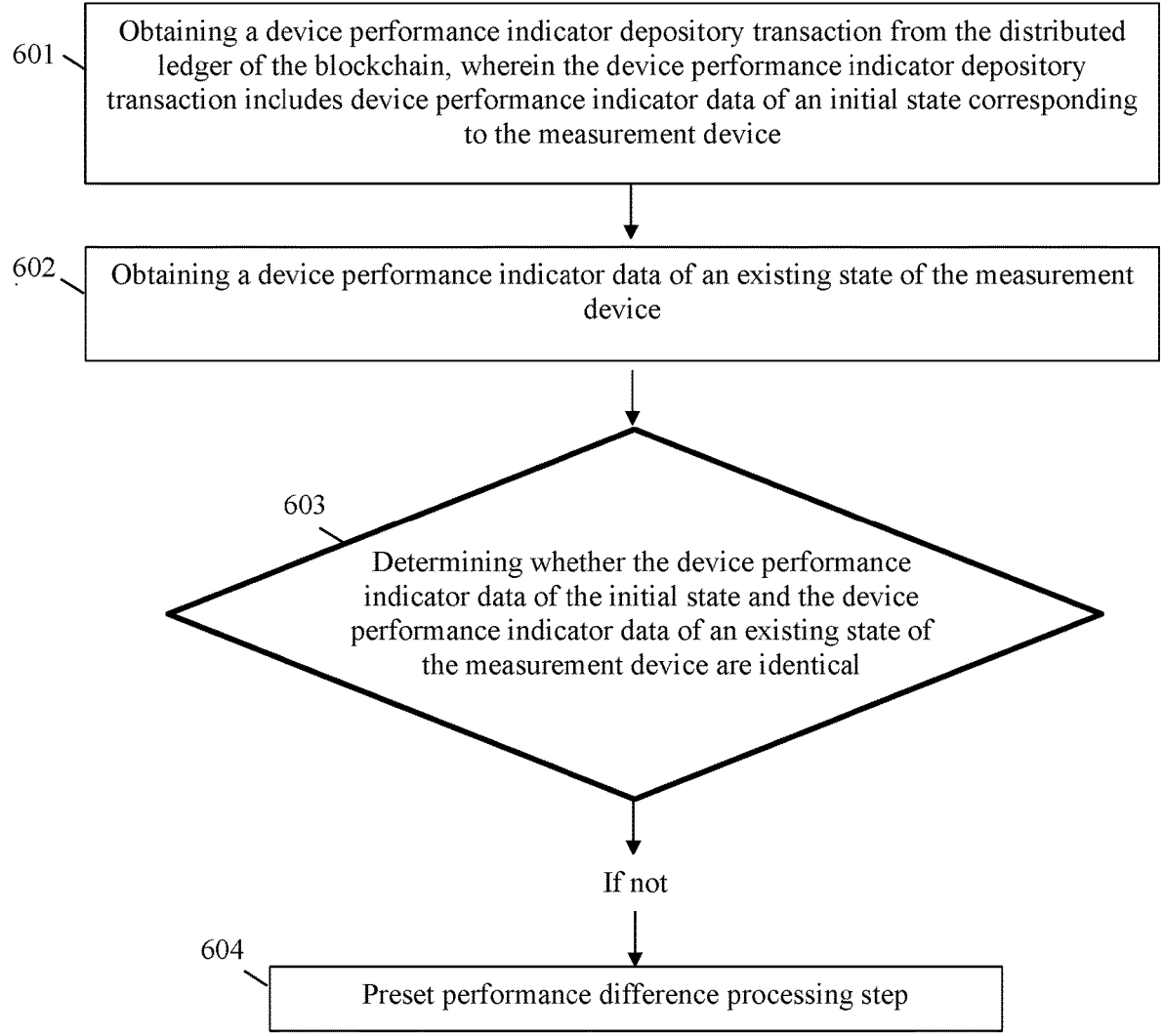
FIG. 6 is a schematic flow diagram of a method for managing calibration of a measurement device based on a blockchain according to another exemplary embodiment.

FIG. 6 illustrates device performance indicator state management of the measurement device based on an exemplary method for managing a measurement device as disclosed herein. A management process includes:

step 601, obtaining a device performance indicator depository transaction from the distributed ledger of the blockchain, wherein the device performance indicator depository transaction includes device performance indicator data of an initial state corresponding to the measurement device;

step 602, obtaining device performance indicator data of an existing state of the measurement device; and step 603, determining whether the device performance indicator data of the initial state and the device performance indicator data of an existing state of the measurement device are identical, if the device performance indicator data of the initial state and the device performance indicator data of the existing state of the measurement device are identical, the performance state of the measurement device being normal and a measurement state of the device is good, and if the device performance indicator data of the initial state is different from the device performance indicator data of the existing state of the measurement device, the operating state or the precision of measurement results being abnormal, at which time, a preset performance difference processing logic may be performed as shown in step 604, for example, sending a performance difference prompt or a device difference adjustment prompt to the user interface of the management client so as to notice relevant personnel, or the device performance indicator data of the existing state or the device performance indicator difference between the initial state and the existing state is uploaded to the distributed ledger of the blockchain in a transaction format by the measurement device (as a node device) or a node device connected to the measurement device so as to record or deposit the difference.

After the measurement device is used for a certain period, the performance state of the measurement device may decline. With the process of device performance state management of the measurement device described in the steps 601 to 604, the tamper-resistant mechanism based on the blockchain may deposit device performance indicators of the initial state of the measurement device, so as to manage the performance state of the measurement device, thereby facilitating the relevant personnel to know the difference between the performance states of the measurement device timely for responding accordingly.

Exemplary Embodiment 6: Method for Managing a Device Performance State of a Measurement Device with Invocation of a Smart Contract In an exemplary embodiment, a smart contract used to manage a device performance state of a measurement device is declared in the blockchain network, and the smart contract may declare a device performance state management logic for the measurement device as described in the steps 601 to 604. The measurement device may be communicatively connected to the management client of the blockchain, or the measurement device may serve as the management client of the blockchain. The method for managing a device performance state of a measurement device described in the embodiment may include:

invoking, in response to an invocation transaction for device performance state management of the measurement device sent by the management client, the device performance state management logic for the measurement device declared by the smart contract to compare the device performance indicator data of the existing state of the measurement device with the device performance indicator data of the initial state deposited on the blockchain, and performing the preset performance difference processing logic if the device performance indicators of the measurement device are changed abnormally.

Performance state management of the measurement device may be completed automatically if the smart contract invocation transaction is sent to the blockchain by the management client, which saves the time and economic cost spent in querying the performance indicator state of the measurement device on site by professional personnel; with the tamper-resistant mechanism based on the blockchain, the performance indicator data of the initial state is prevented from being tampered or lost, thereby ensuring the accuracy of the data; and based on the preset performance difference processing logic, performance difference processing is completed automatically.

Exemplary Embodiment 7: Method for Managing an Abnormal State of a Measurement Device Exemplary measurement devices can be configured with various types of sensors to acquire data signals or supervise a use environment condition for the device. In an exemplary embodiment, when abnormal state information, for example, abnormal temperature information, humidity information, shock information, and the like, is sensed by the measurement device or a sensing module provided in the measurement device, the abnormal state information may be uploaded to the distributed ledger of the blockchain in a transaction format by the measurement device (as a node device) or a node device connected to the measurement device, thereby performing blockchain depository on the abnormal state information. It should be noted that the transaction may also include a classification index value corresponding to the abnormal state information, or relates to setting corresponding classification index values for different types of abnormal state information respectively, so as to facilitate retrieval and query of the abnormal state information.

In failure analysis of the measurement device, various types of abnormal state information stored may be read from the blockchain according to the classification index value, and then, failure analysis of the measurement device may be carried out according the abnormal state information.

Optionally, an execution logic for obtaining abnormal state information from the distributed ledger of the blockchain and performing failure analysis of the measurement device based on a preset failure analysis logic may be declared in the smart contract. The measurement device may be communicatively connected to the management client of the blockchain, or the measurement device may serve as the management client of the blockchain.

A management logic declared by the smart contract can be invoked in response to an invocation transaction for failure analysis management of the measurement device sent by the management client to obtain abnormal state information from the distributed ledger of the blockchain and perform failure analysis of the measurement device based on the preset failure analysis logic. The management client may obtain results of running the smart contract by listening to or querying a transaction log of the blockchain.

With the invocation transaction sent by the management client, any personnel managing the measurement device may complete failure analysis of the measurement device according to the smart contract conveniently and rapidly. Since the smart contract may be run by invoking at any time, the cost spent in performing failure analysis of the measurement device on site by professional failure maintenance or analysis personnel is greatly saved in this exemplary embodiment.

In another illustrated exemplary embodiment, the device state data may include logistics circulation information data. A life cycle management logic declared by the smart contract may comprise: performing circulation process tracing of the measurement device based on the logistics circulation information data stored in the distributed ledger of the blockchain. With the tamper-resistant mechanism based on the blockchain and the invocation by the management client, circulation tracing of the measurement device may be performed in a precise manner, thereby effectively preventing forging circulation of the measurement device.

In another illustrated exemplary embodiment, the device state data may include software information data (such as a software version number) carried by the measurement device, and the life cycle management logic declared by the smart contract may include: performing software update management of the measurement device based on the software information data stored in the distributed ledger of the blockchain. For example, when the current software version number of the measurement device is lower than the software version number stored in the blockchain, software upgrading on the measurement device is performed; and when the current software version number of the measurement device is higher than the software version number stored in the blockchain, a depository transaction of the current software version number is sent to the distributed ledger of the blockchain. With the tamper-resistant mechanism based on the blockchain and the invocation by the management client, software state management of the measurement device may be performed quickly and accurately.

In another illustrated exemplary embodiment, the device state data may include factory setting parameters or system backup parameters of the measurement device, and the life cycle management logic declared by the smart contract may include: restoring settings of the measurement device based on the factory setting parameters or system backup parameters stored in the distributed ledger of the blockchain. With the tamper-resistant mechanism based on the blockchain and the invocation by the management client, the measurement device may achieve an expected recovery setting quickly and accurately.

In another illustrated exemplary embodiment, the device state data may include standard operation procedure (SOP) information data, and the life cycle management logic declared by the smart contract may include: bringing the measurement device into the standard operation procedure based on the SOP data stored in the distributed ledger of the blockchain. With the tamper-resistant mechanism based on the blockchain and the invocation by the management client, the measurement device may be used quickly and accurately according to the standard operation procedure.

According to various exemplary embodiments described herein, a node device of the blockchain can send various device state data in the life cycle of the measurement device to the distributed ledger of the blockchain network for depository. Therefore, the life cycle management of the measurement device can be performed by taking the above-mentioned various device state data as a basis, in terms of information depository, information traceability, information backup and reuse, other information application or the like. Due to the tamper-resistant mechanism of the blockchain, the life cycle management logic described in each of the exemplary embodiments is based on accurate data, thus improving the accuracy of the management of the measurement device; since various state data of the measurement device during the production process, logistics circulation, installation and debugging, use process, and maintenance stage of the measurement equipment are all stored in the distributed ledger of the blockchain, not only the security of storage of device state data is improved, but also the ratio of application based on the above-mentioned various device state data and the efficiency of the management of measurement device is increased, compared to the distributed storage of the various management information in manufacturer terminals and logistics company terminals and client terminals. Moreover, based on the method for managing a measurement device as disclosed herein, a metering supervision institution in measuring industry may serve as the node device of the blockchain (for example, as the alliance member node device of the alliance chain) to obtain the device state data corresponding to various stages of the life cycle of the measurement device, thereby achieving supervision of production, circulation, usage, and maintenance conditions of the measurement device rapidly and accurately.

In order to further improve the security of the management of the measurement device and prevent the state data information of the measurement device from being learned by unauthorized client terminals or node devices, exemplary node devices may encrypt the device state data when constructing the target transaction.

For example, the node device used to send the target transaction may use the public key of the authorized client to encrypt the device state data, and package the ciphertext to the target transaction; and as a node device or a blockchain client of an authorized client terminal, the ciphertext contained in the target transaction can be decrypted based on the private key of the authorized client, thereby obtaining the original text of the device state data. For a terminal of unauthorized client, even if being a node device of the blockchain, has obtained the target transaction, the original information of the device state data cannot be obtained because the ciphertext cannot be decrypted.

Corresponding to the disclosed process implementation, exemplary embodiments of the specification provide an apparatus 70 for managing a measurement device based on a blockchain. The apparatus 70 may be implemented by software, and may also be implemented by hardware or a combination of software and hardware. Taking software implementation as an example, as an apparatus in a logical sense, it is formed by reading a corresponding computer program instruction into a memory through a CPU (Central Process Unit) of an device where it is located. In terms of hardware, in addition to the CPU, the internal storage, and the memory shown in FIG. 8, the device where the above apparatus is located generally also includes other hardware such as a chip for wireless signal transmission and reception, and/or a board card for realizing network communication function and other hardware.

Figure 7:
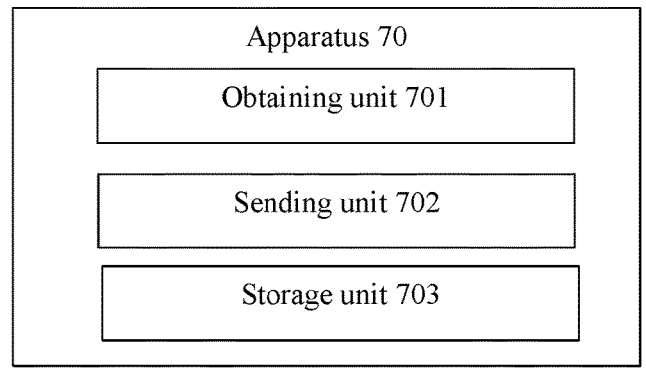
FIG. 7 is a schematic diagram of an apparatus for managing a measurement device based on a blockchain according to an exemplary embodiment.

As shown in FIG. 7, an exemplary apparatus 70 for managing a measurement device based on a blockchain, is applied to node devices in a blockchain network, the apparatus including:

an obtaining unit 701 for obtaining device state data of the measurement device at various stages in the life cycle of the measurement device;

a sending unit 702 for constructing a target transaction based on the obtained device state data, and then sending the target transaction to other node devices in the blockchain network to perform consensus processing on the target transaction; and a storage unit 703 for storing, when a consensus of the target transaction is reached, the target transaction into a distributed ledger of the blockchain network, wherein the target transaction stored in the distributed ledger of the blockchain network is used for life cycle management of the measurement device.

In another illustrated exemplary embodiment, the target transaction includes the device state data or a ciphertext of the device state data; and the life cycle includes a plurality of stages within a cycle of the measurement device from production to retirement, wherein the life cycle includes any combination of the following stages:

a production stage, a logistics stage, an installation stage, a usage stage, and a maintenance stage.

In another illustrated exemplary embodiment, a smart contract for life cycle management of the measurement device is deployed in the blockchain; and the life cycle management of the measurement device includes:

invoking, in response to a target invocation transaction for life cycle management of the measurement device sent by a management client, a life cycle management logic declared by the smart contract for life cycle management of the measurement device based on the device state data.

In another illustrated exemplary embodiment, device state data corresponding to the installation stage includes device calibration information data; and the life cycle management logic includes a calibration logic for the measurement device, wherein the calibration logic for the measurement device includes:

step A, calibrating the measurement device;
step B, obtaining the target transaction from the distributed ledger of the blockchain, wherein the target transaction includes the latest calibration information data corresponding to the measurement device;
step C, obtaining existing calibration information data of the measurement device; and
step D, determining whether the latest calibration information data and the existing calibration information data are identical, and if the latest calibration information data is different from the existing calibration information data, performing the steps A to D again until the latest calibration information data is identical to the existing calibration information data.

In another illustrated exemplary embodiment, device state data corresponding to the usage stage includes a lead-sealing identification code; the life cycle management logic includes an electronic lead-sealing state management logic for the measurement device; wherein the electronic lead-sealing state management logic includes:

step A, obtaining the target transaction from the distributed ledger of the blockchain, wherein the target transaction includes the latest lead-sealing identification code corresponding to the measurement device;
step B, obtaining an existing lead-sealing identification code of the measurement device; and
step C, determining whether the latest lead-sealing identification code and the existing lead-sealing identification code are identical, and
if the latest lead-sealing identification code is different from the existing lead-sealing identification code,
step D, performing a preset alarm or prompt operation.

In another illustrated exemplary embodiment, device state data corresponding to the usage stage includes abnormal state information data; and the life cycle management logic includes an abnormal state management logic for the measurement device, wherein the abnormal state management logic includes: step A, obtaining the target transaction from the distributed ledger of the blockchain, wherein the target transaction includes abnormal state information corresponding to the measurement device; and step B: executing a preset failure analysis logic based on the abnormal state information.

In another illustrated exemplary embodiment, device state data corresponding to the usage stage includes device performance indicator data; and the life cycle management logic includes a device performance state management logic for the measurement device, wherein the device performance state management logic includes:

step A, obtaining the target transaction from the distributed ledger of the blockchain, wherein the target transaction includes device performance indicator data of an initial state corresponding to the measurement device;
step B, obtaining device performance indicator data of an existing state of the measurement device; and
step C, determining whether the device performance indicator data of the initial state and the device performance indicator data of the existing state are identical, and
if the device performance indicator data of the initial state is different from the device performance indicator data of the existing state,
step D, performing a preset performance difference processing logic.

In another illustrated exemplary embodiment, performance indicator data includes one or more of metering performance indicator data, measurement precision indicator data, creep indicator data, measurement repeatability indicator data, operating environment indicator data, and electromagnetic compatibility indicator data.

In another illustrated exemplary embodiment, device state data corresponding to the usage stage includes device operating environment data, wherein the device operating environment data includes one or more of temperature, humidity, air pressure, shock, load, and device tilt data.

In another illustrated exemplary embodiment, device state data corresponding to the maintenance stage includes one or more of maintenance service personnel data, maintenance time data, and maintenance device identifier data.

In another illustrated exemplary embodiment, a node device for life cycle management of the measurement device includes a metering supervision institution node device.

In another illustrated exemplary embodiment, the target transaction includes a classification index value that is used to identify the category of the device state data.

In another illustrated exemplary embodiment, the node device includes the measurement device.

In another illustrated exemplary embodiment, the blockchain is an alliance chain, and a process of joining the measurement device to the blockchain network includes:
obtaining, by an alliance member node device of the alliance chain, a chain entry request from the measurement device; and
determining whether the measurement device conforms to a preset chain entry condition for nodes; and
if yes,
sending, to the measurement device, a verification of chain entry permission to be a node device of the alliance chain so as to enable the measurement device to join the blockchain network after the verification of chain entry permission is passed.

In another illustrated exemplary embodiment, the distributed ledger of the blockchain includes a local storage database of the node devices of the blockchain network, or a database of cloud storage servers connected to the node devices of the blockchain network.

For details about the implementation process of the functions and effects of the units 701, 702, 703 in the exemplary apparatus 70, see the implementation process of the corresponding steps in the method for managing a measurement device based on a blockchain performed by the node devices of the blockchain, and for the relevant parts, see the description in the section of the exemplary method embodiment which is not repeated here.

The apparatus embodiments described herein are only illustrative, and the units described as separate components may or may not be physically separated, and the components displayed as units may or may not be physical modules, that is, may be located in one place, or may be distributed to multiple network modules. Some or all of the units or modules may be selected according to actual needs to achieve the objectives of the solution in this specification. Those of ordinary skill in the art can understand and implement the exemplary embodiment without creative efforts.

The apparatus, units, and modules described in the above embodiments may be specifically implemented by a computer chip or entity, or may be implemented by a product having a certain function. An exemplary implementation device is a computer, and the specific form of the computer may be a personal computer, a laptop computer, a cellular phone, a camera phone, a smart phone, a personal digital assistant, a media player, a navigation device, an email sending and receiving device, and a game control desk, a tablet computer, a wearable device, or a combination of any of these devices.

Figure 8:
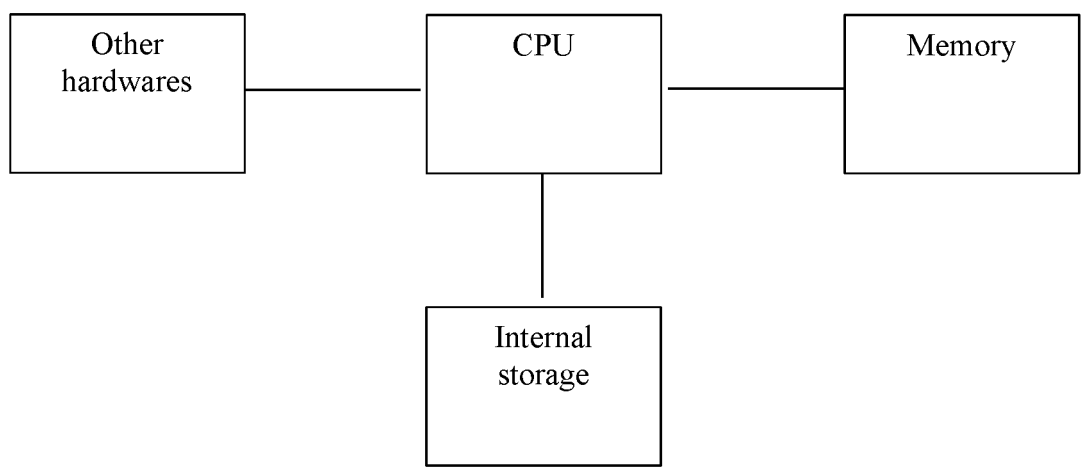
FIG. 8 is a structural diagram of hardware for implementing embodiments of the apparatus for managing a measurement device based on a blockchain as disclosed herein.

Corresponding to the exemplary embodiments of the method, the exemplary embodiments disclosed provide a computer device, as shown in FIG. 8, which includes a memory and a processor. The memory has stored thereon a computer program executable by the processor. The processor, when executing the stored computer program, implementing the various steps of the method for managing a measurement device based on a blockchain, which is performed by the node devices of the blockchain as described in the exemplary embodiments. For a detailed description of each step of the method for managing a measurement device based on a blockchain performed by the node device, refer to the previous content, and will not be repeated.

Corresponding to the exemplary embodiments of the method, the exemplary embodiments provide a computer readable storage medium which has stored thereon a computer program that, when executed by a processor, cause the implementation of the steps of the method for managing a measurement device based on a blockchain, which is performed by the node devices of the blockchain as described in the exemplary embodiments herein. For a detailed description of each step of the method for managing a measurement device based on a blockchain which is performed by the node devices of the blockchain, please refer to the previous content, and will not be repeated.

The above are only exemplary and preferred embodiments of this specification and are not intended to limit this specification. Any modification, equivalent replacement, or improvement made within the spirit and principles of this specification shall be included within the protection scope of this specification.

In an exemplary configuration, a computer device includes one or more central processing units (CPUs), an input/output interface, a network interface, and a memory.

The memory may include a non-permanent memory, a random access memory (RAM) and/or a non-volatile memory (such as a read-only memory (ROM) or a flash memory (flash RAM)) and so on in a computer-readable medium. A memory is an example of a computer-readable medium.

The computer-readable medium can include non-volatile and volatile media, and removable and non-removable media, wherein information storage can be implemented with any method or technology. Information may be computer-readable instructions, data structures, program modules, or other data.

Examples of a computer storage medium include but are not limited to a phase-change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a transitory computer-readable medium, such as a modulated data signal and carrier.

It should further be noted that the terms "include", "comprise", or any variation thereof are intended to cover a non-exclusive inclusion. Therefore, in the context of a process, method, commodity, or device that includes a series of elements, the process, method, commodity, or device not only includes such elements, but also includes other elements not specified expressly, or may comprise inherent elements of the process, method, commodity, or device. If no more limitations are made, an element limited by "comprise a/an . . . " does not exclude other same elements existing in the process, the method, the article, or the device which includes the element.

Those skilled in the art will understand that embodiments of the disclosure may be provided as a method, a system, or a computer program product. Therefore, the embodiments of the specification may use a form of hardware only embodiments, software only embodiments, or embodiments with a combination of software and hardware. Moreover, the embodiments of the specification may use a form of a computer program product that is implemented on one or more computer-usable storage media (including but not limited to a disk memory, a CD-ROM, an optical memory, and the like) that include computer usable program code.

It will therefore be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for managing a measurement device based on a blockchain, which is applied to node devices in a blockchain network, the method comprising:
   obtaining device state data of the measurement device at various stages in a life cycle of the measurement device;
   constructing a target transaction based on the obtained device state data, and then sending the target transaction to other node devices in the blockchain network to perform consensus processing on the target transaction; and
   storing, when a consensus of the target transaction is reached, the target transaction into a distributed ledger of the blockchain network, wherein the target transaction stored in the distributed ledger of the blockchain network is used for life cycle management of the measurement device;
   wherein the target transaction includes the device state data or a ciphertext of the device state data, and the life cycle includes a plurality of stages within a cycle of the measurement device from production to retirement;
   wherein the life cycle includes any combination of the following stages: a production stage, a logistics stage, an installation stage, a usage stage, and a maintenance stage;
   wherein a smart contract for life cycle management of the measurement device is deployed in the blockchain, and the life cycle management of the measurement device comprises: invoking, in response to a target invocation transaction for life cycle management of the measurement device sent by a management client, a life cycle management logic declared by the smart contract for life cycle management of the measurement device based on the device state data;
   wherein device state data corresponding to the usage stage includes a lead-sealing identification code; and the life cycle management logic includes an electronic lead-sealing state management logic for the measurement device, wherein the electronic lead-sealing state management logic performs:
   step A, obtaining the target transaction from the distributed ledger of the blockchain, wherein the target transaction includes the latest lead-sealing identification code corresponding to the measurement device;
   step B, obtaining an existing lead-sealing identification code of the measurement device; and
   step C, determining that the latest lead-sealing identification code is different from the existing lead-sealing identification code, step D, performing a preset prompt or alarm operation.

2. A method for managing a measurement device based on a blockchain, which is applied to node devices in a blockchain network, the method comprising:
   obtaining device state data of the measurement device at various stages in a life cycle of the measurement device;
   constructing a target transaction based on the obtained device state data, and then sending the target transaction to other node devices in the blockchain network to perform consensus processing on the target transaction; and
   storing, when a consensus of the target transaction is reached, the target transaction into a distributed ledger of the blockchain network, wherein the target transaction stored in the distributed ledger of the blockchain network is used for life cycle management of the measurement device;
   wherein the target transaction includes the device state data or a ciphertext of the device state data, and the life cycle includes a plurality of stages within a cycle of the measurement device from production to retirement;
   wherein the life cycle includes any combination of the following stages: a production stage, a logistics stage, an installation stage, a usage stage, and a maintenance stage;
   wherein a smart contract for life cycle management of the measurement device is deployed in the blockchain, and the life cycle management of the measurement device comprises: invoking, in response to a target invocation transaction for life cycle management of the measurement device sent by a management client, a life cycle management logic declared by the smart contract for life cycle management of the measurement device based on the device state data;
   wherein device state data corresponding to the usage stage includes abnormal state information data; and the life cycle management logic includes an abnormal state management logic for the measurement device, wherein the abnormal state management logic performs:
   step A, obtaining the target transaction from the distributed ledger of the blockchain, wherein the target transaction includes abnormal state information corresponding to the measurement device; and
   step B: executing a preset failure analysis logic based on the abnormal state information.

3. The method of claim 2, wherein device state data corresponding to the installation includes device calibration information data; and the life cycle management logic includes a calibration logic for the measurement device; wherein the calibration logic for the measurement device performs:

step A, calibrating the measurement device;

step B, obtaining the target transaction from the distributed ledger of the blockchain, wherein the target transaction includes the latest calibration information data corresponding to the measurement device;

step C, obtaining existing calibration information data of the measurement device; and step D, determining that the latest calibration information data is different from the existing calibration information data, and performing the steps A to D again until the latest calibration information data is identical to the existing calibration information data.

4. The method of claim 2, wherein device state data corresponding to the usage stage comprises:

device operating environment data, wherein the device operating environment data includes one or more of temperature, humidity, air pressure, shock, load, and device tilt data; and wherein device state data corresponding to the maintenance stage comprises:

one or more of maintenance service personnel data, maintenance time data, and maintenance device identifier data.

5. The method of claim 2, wherein a node device for life cycle management of the measurement device comprises:

a metering supervision institution node device; and wherein the target transaction includes a classification index value that is used to identify the category of the device state data.

6. The method of claim 2, wherein the distributed ledger of the blockchain comprises:

a local storage database of the node devices of the blockchain network, or a database of cloud storage servers connected to the node devices of the blockchain network.

7. A computer device, comprising:

a memory and a processor, wherein the memory has stored thereon a computer program executable by the processor that, when executed by the processor, implements the method of claim 2.

8. A computer readable storage medium having stored thereon a computer program, wherein the computer program, when executed by a processor, implements the method of claim 2.

9. A method for managing a measurement device based on a blockchain, which is applied to node devices in a blockchain network, the method comprising:

obtaining device state data of the measurement device at various stages in a life cycle of the measurement device;

constructing a target transaction based on the obtained device state data, and then sending the target transaction to other node devices in the blockchain network to perform consensus processing on the target transaction; and storing, when a consensus of the target transaction is reached, the target transaction into a distributed ledger of the blockchain network, wherein the target transaction stored in the distributed ledger of the blockchain network is used for life cycle management of the measurement device;

wherein the target transaction includes the device state data or a ciphertext of the device state data, and the life cycle includes a plurality of stages within a cycle of the measurement device from production to retirement;

wherein the life cycle includes any combination of the following stages: a production stage, a logistics stage, an installation stage, a usage stage, and a maintenance stage;

wherein a smart contract for life cycle management of the measurement device is deployed in the blockchain, and the life cycle management of the measurement device comprises: invoking, in response to a target invocation transaction for life cycle management of the measurement device sent by a management client, a life cycle management logic declared by the smart contract for life cycle management of the measurement device based on the device state data;

wherein device state data corresponding to the usage stage includes device performance indicator data; and the life cycle management logic includes a device performance state management logic for the measurement device, wherein the device performance state management logic performs:

step A, obtaining the target transaction from the distributed ledger of the blockchain, wherein the target transaction includes device performance indicator data of an initial state corresponding to the measurement device;

step B, obtaining device performance indicator data of an existing state of the measurement device; and step C, determining that the device performance indicator data of the initial state is different from the device performance indicator data of the existing state, step D, performing a preset performance difference processing logic.

10. The method of claim 9, wherein performance indicator data comprises:

one or more of metering performance indicator data, measurement precision indicator data, creep indicator data, measurement repeatability indicator data, operating environment indicator data, and electromagnetic compatibility indicator data.

11. The method of claim 10, wherein the blockchain is an alliance chain, and a process of joining the measurement device to the blockchain network comprises:

obtaining, by an alliance member node device of the alliance chain, a chain entry request from the measurement device;

determining that the measurement device conforms to a preset chain entry condition for nodes; and sending, to the measurement device, a verification of chain entry permission to be a node device of the alliance chain so as to enable the measurement device to join the blockchain network after the verification of chain entry permission is passed.

12. An apparatus for managing a measurement device based on a blockchain, which is applied to node devices in a blockchain network, the apparatus comprising:

an obtaining unit for obtaining device state data of the measurement device at various stages in the life cycle of the measurement device;

a sending unit for constructing a target transaction based on the obtained device state data, and then sending the target transaction to other node devices in the blockchain network to perform consensus processing on the target transaction; and a storage unit for storing, when a consensus of the target transaction is reached, the target transaction into a distributed ledger of the blockchain network, wherein the target transaction stored in the distributed ledger of the blockchain network is used for life cycle management of the measurement device;

wherein the target transaction includes the device state data or a ciphertext of the device state data, and the life cycle includes a plurality of stages within a cycle of the measurement device from production to retirement, wherein the life cycle includes any combination of the following stages: a production stage, a logistics stage, an installation stage, a usage stage, and a maintenance stage;

wherein a smart contract for life cycle management of the measurement device is deployed in the blockchain, and the life cycle management of the measurement device comprises: a processor for invoking, in response to a target invocation transaction for life cycle management of the measurement device sent by a management client, a life cycle management logic declared by the smart contract for life cycle management of the measurement device based on the device state data;

wherein device state data corresponding to the usage stage incudes a lead-sealing identification code; and the life cycle management logic comprises: an electronic lead-sealing state management logic for the measurement device; wherein the electronic lead-sealing state management logic comprises logic for:
step A, obtaining the target transaction from the distributed ledger of the blockchain, wherein the target transaction includes the latest lead-sealing identification code corresponding to the measurement device;
step B, obtaining an existing lead-sealing identification code of the measurement device; and
step C, determining that the latest lead-sealing identification code is different from the existing lead-sealing identification code,
step D, performing a preset alarm or prompt operation.

13. An apparatus for managing a measurement device based on a blockchain, which is applied to node devices in a blockchain network, the apparatus comprising:
an obtaining unit for obtaining device state data of the measurement device at various stages in the life cycle of the measurement device;
a sending unit for constructing a target transaction based on the obtained device state data, and then sending the target transaction to other node devices in the blockchain network to perform consensus processing on the target transaction; and
a storage unit for storing, when a consensus of the target transaction is reached, the target transaction into a distributed ledger of the blockchain network, wherein the target transaction stored in the distributed ledger of the blockchain network is used for life cycle management of the measurement device;
wherein the target transaction includes the device state data or a ciphertext of the device state data, and the life cycle includes a plurality of stages within a cycle of the measurement device from production to retirement, wherein the life cycle includes any combination of the following stages: a production stage, a logistics stage, an installation stage, a usage stage, and a maintenance stage;
wherein a smart contract for life cycle management of the measurement device is deployed in the blockchain, and the life cycle management of the measurement device comprises: a processor for invoking, in response to a target invocation transaction for life cycle management of the measurement device sent by a management client, a life cycle management logic declared by the smart contract for life cycle management of the measurement device based on the device state data;

wherein device state data corresponding to the usage stage includes abnormal state information data; and the life cycle management logic comprises an abnormal state management logic for the measurement device; wherein the abnormal state management logic comprises logic for:
step A, obtaining the target transaction from the distributed ledger of the blockchain, wherein the target transaction includes abnormal state information corresponding to the measurement device; and
step B: executing a preset failure analysis logic based on the abnormal state information.

14. The apparatus of claim 13, wherein device state data corresponding to the installation stage includes device calibration information data; and
the life cycle management logic includes a calibration logic for the measurement device;
wherein
the calibration logic for the measurement device comprises logic for:
step A, calibrating the measurement device;
step B, obtaining the target transaction from the distributed ledger of the blockchain, wherein the target transaction includes the latest calibration information data corresponding to the measurement device;
step C, obtaining existing calibration information data of the measurement device; and
step D, determining that the latest calibration information data is different from the existing calibration information data, performing the steps A to D again until the latest calibration information data is identical to the existing calibration information data.

15. The apparatus of claim 13, wherein a node device for life cycle management of the measurement device comprises:
a metering supervision institution node device.

16. The apparatus of claim 13, wherein the node device comprises:
the measurement device.

17. The apparatus of claim 13, wherein the distributed ledger of the blockchain comprises:
a local storage database of the node devices of the blockchain network, or a database of cloud storage servers connected to the node devices of the blockchain network.

18. An apparatus for managing a measurement device based on a blockchain, which is applied to node devices in a blockchain network, the apparatus comprising:
an obtaining unit for obtaining device state data of the measurement device at various stages in the life cycle of the measurement device;
a sending unit for constructing a target transaction based on the obtained device state data, and then sending the target transaction to other node devices in the blockchain network to perform consensus processing on the target transaction; and
a storage unit for storing, when a consensus of the target transaction is reached, the target transaction into a distributed ledger of the blockchain network, wherein the target transaction stored in the distributed ledger of the blockchain network is used for life cycle management of the measurement device;
wherein the target transaction includes the device state data or a ciphertext of the device state data, and the life cycle includes a plurality of stages within a cycle of the measurement device from production to retirement, wherein the life cycle includes any combination of the following stages: a production stage, a logistics stage, an installation stage, a usage stage, and a maintenance stage;

wherein a smart contract for life cycle management of the measurement device is deployed in the blockchain, and the life cycle management of the measurement device comprises: a processor for invoking, in response to a target invocation transaction for life cycle management of the measurement device sent by a management client, a life cycle management logic declared by the smart contract for life cycle management of the measurement device based on the device state data;

wherein device state data corresponding to the usage stage includes device performance indicator data; and the life cycle management logic comprises a device performance state management logic for the measurement device, wherein the device performance state management logic comprises logic for:

step A, obtaining the target transaction from the distributed ledger of the blockchain, wherein the target transaction includes device performance indicator data of an initial state corresponding to the measurement device;

step B, obtaining device performance indicator data of an existing state of the measurement device; and step C, determining that the device performance indicator data of the initial state is different from the device performance indicator data of the existing state, step D, performing a preset performance difference processing logic.

* * * * *